(12) United States Patent
Azizi et al.

(10) Patent No.: US 9,948,307 B2
(45) Date of Patent: Apr. 17, 2018

(54) SUPPORTING PSEUDO OPEN DRAIN INPUT/OUTPUT STANDARDS IN A PROGRAMMABLE LOGIC DEVICE

(71) Applicant: Altera Corporation, San Jose, CA (US)

(72) Inventors: Navid Azizi, Markham (CA); Gordon Raymond Chiu, North York (CA); Michael Howard Kipper, Thornhill (CA)

(73) Assignee: ALTERA CORPORATION, San Jose, CA (US)

( * ) Notice: Subject to any disclaimer, the term of this patent is extended or adjusted under 35 U.S.C. 154(b) by 0 days.

(21) Appl. No.: 15/633,473

(22) Filed: Jun. 26, 2017

(65) Prior Publication Data

US 2017/0359073 A1  Dec. 14, 2017

Related U.S. Application Data

(63) Continuation of application No. 13/935,273, filed on Jul. 3, 2013, now Pat. No. 9,698,795.

(51) Int. Cl.
*H03K 19/20* (2006.01)
*G06F 17/50* (2006.01)

(52) U.S. Cl.
CPC .......... *H03K 19/20* (2013.01); *G06F 17/50* (2013.01); *G06F 17/5045* (2013.01)

(58) Field of Classification Search
None
See application file for complete search history.

(56) References Cited

U.S. PATENT DOCUMENTS

| | | | | |
|---|---|---|---|---|
| 5,396,128 A | * | 3/1995 | Dunning | H03K 19/00315 326/21 |
| 5,825,206 A | * | 10/1998 | Krishnamurthy | H03K 19/00315 326/81 |
| 5,933,025 A | * | 8/1999 | Nance | H03K 19/00315 326/81 |
| 6,043,680 A | * | 3/2000 | Dasgupta | H03K 19/00315 326/57 |
| 6,078,191 A | * | 6/2000 | Chan | H03K 19/1737 326/40 |
| 6,107,830 A | * | 8/2000 | Okumura | H03K 19/00315 326/58 |
| 6,175,253 B1 | * | 1/2001 | Maiyuran | H03K 19/018592 326/58 |
| 8,358,148 B1 | * | 1/2013 | Kaviani | H03K 19/1736 326/38 |
| 2002/0003436 A1 | * | 1/2002 | Andrews | G06F 1/10 326/40 |
| 2004/0212398 A1 | * | 10/2004 | Kitazawa | H03K 19/00315 326/57 |
| 2005/0265095 A1 | * | 12/2005 | Sumitani | G11C 7/12 365/203 |

(Continued)

*Primary Examiner* — Jany Richardson
(74) *Attorney, Agent, or Firm* — Fletcher Yoder P.C.

(57) ABSTRACT

Techniques and mechanisms allow a Programmable Logic Device (PLD) to support a pseudo open drain (POD) input/output (I/O) standard used in interface protocols such as fourth generation double data rate (DDR4). An OR gate with inputs including data and an inverted output enable from a user's design may be inserted into programmable logic. The output of the OR gate may be coupled with an input of an I/O buffer.

20 Claims, 7 Drawing Sheets

(56) References Cited

U.S. PATENT DOCUMENTS

2006/0049847 A1\* 3/2006 Chen ............... H03K 19/00315
326/87
2008/0224733 A1\* 9/2008 Dale ............... H03K 19/09429
326/56

\* cited by examiner

| Data 120 | Output Enable 115 | Output |
|---|---|---|
| 0 | 0 | Z |
| 1 | 0 | Z |
| 0 | 1 | 0 |
| 1 | 1 | 1 |

FIGURE 2A

| Data 120 | Output Enable 115 | Output |
|---|---|---|
| 0 | 0 | 1 |
| 1 | 0 | 1 |
| 0 | 1 | 0 |
| 1 | 1 | 1 |

SUPPORTING PSEUDO OPEN DRAIN INPUT/OUTPUT STANDARDS IN A PROGRAMMABLE LOGIC DEVICE

CROSS-REFERENCE TO RELATED APPLICATIONS

This application is a continuation of U.S. patent application Ser. No. 13/935,273 filed on Jul. 3, 2013, which is incorporated by reference herein in its entirety for all purposes.

TECHNICAL FIELD

This disclosure generally relates to integrated circuits. More specifically, the disclosure relates to systems and methods for supporting a pseudo open drain (POD) input/output (I/O) standard.

DESCRIPTION OF THE RELATED TECHNOLOGY

A programmable logic device (PLD) is a semiconductor integrated circuit which contains logic circuitry and routing that may be configured to perform a host of logic functions. In a typical scenario, a designer uses electronic design automation (EDA) tools to create a design. These tools use information regarding the hardware capabilities of a given programmable logic device to help the designer implement the custom logic circuit using multiple resources available on that given programmable logic device.

In some scenarios, a PLD may interface with another device, or different logic instantiated or designed in a PLD may interface with each other. For instance, a PLD may interface with another PLD or a fixed logic device such as an application specific integrated circuit (ASIC), structured ASIC, processor, memory, or other devices and/or peripherals. Often, interfacing with other devices requires following a particular protocol or standard. For example, interfacing with some SDRAM (synchronous dynamic random-access memory) memories may require following a DDR4 (fourth generation double data rate) protocol.

However, new interface protocols may be developed following the design of a PLD. That is, a PLD may be designed, taped-out, and fabricated before the release of a new interface protocol standard such as DDR4 for SDRAM.

Allowing a PLD to support a new interface standard without changing the design of the PLD itself provides a multitude of advantages. The PLD may not need to be redesigned, recharacterized, and fabricated again. Moreover, an older PLD may still be used for newer interface standards, providing cost savings and potentially extending the market life of older PLDs.

SUMMARY

The subject matter described herein provides a device, such as a programmable logic device, to support a pseudo-open drain (POD) standard used in interface protocols such as fourth generation double data rate (DDR4). In one example, an input/output (I/O) circuit may include an OR gate. Inputs to the OR gate may include an inverted output enable signal and a data signal. The output enable and data signals may, for example, be received from a user's design in soft logic (e.g., programmable or configurable logic) of the PLD. An output of the OR gate may be coupled to components within the I/O circuit. Additionally, a native output enable input of the I/O circuit may be terminated to a fixed voltage. Accordingly, the POD standard may be followed.

These and other features will be presented in more detail in the following specification and the accompanying figures, which illustrate by way of example.

BRIEF DESCRIPTION OF THE DRAWINGS

FIG. 2A illustrates a truth table for the I/O buffer of FIG. 1B.

FIG. 2B illustrates a truth table for an I/O buffer compatible with the Pseudo Open Drain (POD) I/O standard for fourth generation double data rate (DDR4) synchronous dynamic random-access memory (SDRAM).

DETAILED DESCRIPTION OF PARTICULAR EMBODIMENTS

The techniques and mechanisms disclosed herein are primarily described with reference to Programmable Logic Devices (PLDs) such as Field Programmable Gate Arrays (FPGAs), but are not necessarily limited to PLDs.

Figure 1A:
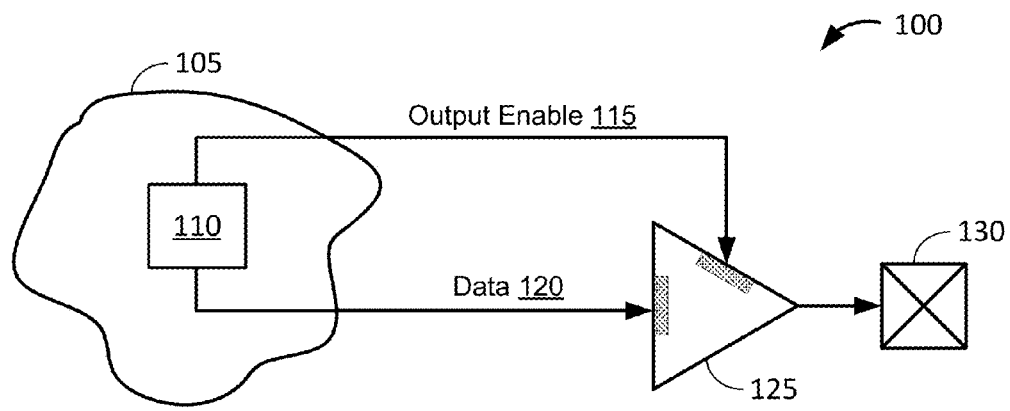
FIG. 1A illustrates an example of soft logic of a Programmable Logic Device (PLD) providing signals to an Input/Output (I/O) buffer.

FIG. 1A illustrates an example of soft logic of a PLD providing signals to an Input/Output (I/O) buffer. In an implementation, an I/O may include an I/O buffer 125 and an I/O pad 130. I/O buffer 125 may receive input signals output enable 115 and data 120 from soft logic 105 (e.g., configurable or programmable logic of a PLD). The output enable 115 and data 120 signals may be received from a user design 110 instantiated within soft logic 105. That is, user design 110 may provide output enable 115 and data 120. In some implementations, the interconnect for the signals may be routed, for example through the placement and routing methodology of the workflow of implementing a PLD, from configured logic associated with user design 110 in soft logic 105 to interconnect associated with the inputs of I/O buffer 125.

As an example, user design 110 may include a soft processor (i.e., a processor instantiated within soft logic 105). When the processor wants to provide data to another device, such as an external memory peripheral, the processor in user design 110 may assert an output enable signal 115 to configure I/O buffer 125 to provide the data 120 signal to output pad 130. Accordingly, data 120 is provided to output pad 130 and available to another device with access to output pad 130 (e.g., by being connected to a pin associated with output pad 130).

Figure 1B:
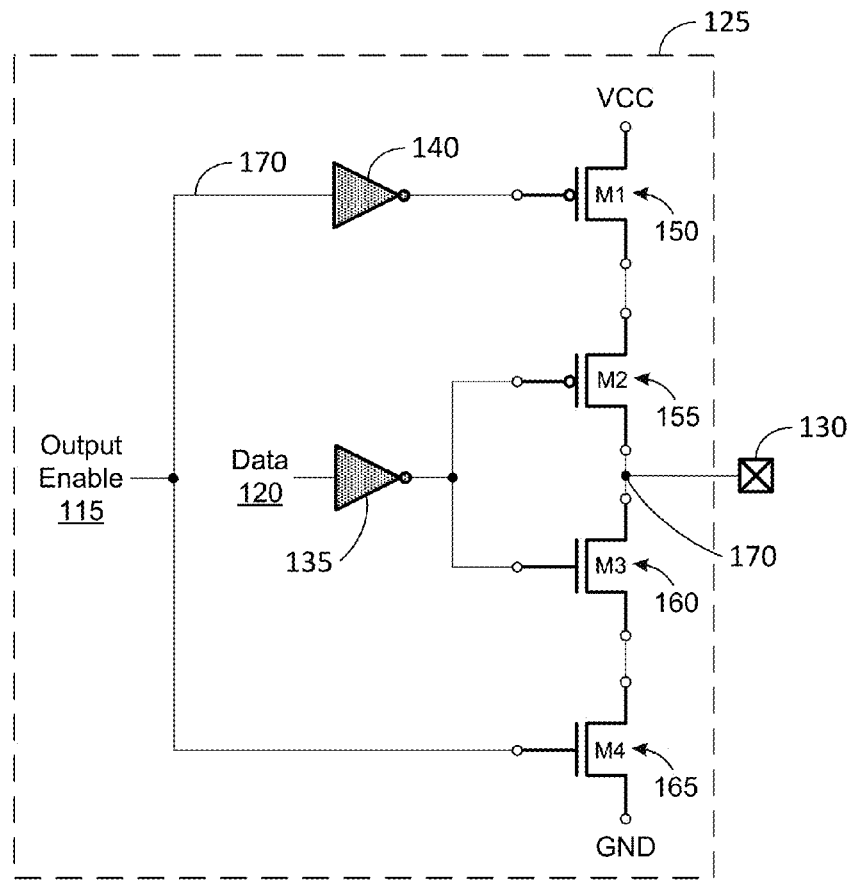
FIG. 1B illustrates a circuit schematic of an I/O buffer in accordance with some implementations.

FIG. 1B illustrates a circuit schematic of I/O buffer 125 in accordance with some implementations. In FIG. 1B, I/O buffer 125 includes four transistors: M1 150, M2 155, M3

160, and M4 165. I/O buffer 125 also includes two inverters 135 and 140. The input of inverter 140 is output enable 115. The input for inverter 135 is data 120. Additionally, high supply voltage VCC and low supply voltage GND are provided.

In an implementation, transistors M1 150 and M2 155 may be PMOS transistors. Transistors M3 160 and M4 165 may be n-type metal-oxide-semiconductor (NMOS) transistors. In FIG. 1B, Transistor M1 150 is coupled to a high supply voltage. Transistor M4 is coupled to a low supply voltage. Transistor M1 150 is coupled to transistor M2 155. Transistor M2 155 is coupled to transistor M3 160 to define an output node 170 coupled to output pad 130. Transistor M3 160 is coupled to transistor M4 165.

Additionally, the gate of transistor M1 150 is coupled to the output of inverter 140. Therefore, the inverse of output enable 115 is provided to the gate of transistor M1 150. That is, if output enable 115 is high (i.e., "1"), then the gate of transistor M1 150 is provided a low signal (i.e., "0"). The gates of transistors M2 155 and M3 160 are coupled together and further coupled to the output of inverter 135. Therefore, the inverse of data 120 is provided to the gates of transistors M2 155 and M3 160. The gate of transistor M4 165 is provided output enable 115. Output enable 115 and data 120 may be provided by a user design, as discussed above. For example, output enable 115 and data 120 may be signals routed from user design 110 in soft logic 105 to hardwired, native interconnect associated with inputs for I/O buffer 125. That is, native output enable 170 may be a fixed interconnect that receives an output enable 115 signal from user design 110 in soft logic 105.

FIG. 2A illustrates a truth table for the I/O buffer of FIG. 1B. In FIG. 2A, if output enable 115 is low (indicated as "0"), output node 170 may be in a high impedance state (tri-stated or floating) indicated as "Z", i.e., it is undriven. In truth table 200, in the first two rows, output enable 115 is low, and therefore outputs 205 are both indicated as being in a high impedance state. If output enable 115 is high, then data 120 may be "passed" to output node 175 and provide the appropriate signal onto output pad 130.

For example, using the first row of truth table 200, if data 120 is low and output enable 115 is low, then the output of inverter 140 in FIG. 1B is high and the output of inverter 135 is high. Transistor M1 150 turns off because it is a PMOS transistor and its gate terminal is coupled to the output of inverter 140, which is providing a high signal. Transistor M4 165 receives output enable 115 via interconnect 170. Accordingly, the gate of transistor M4 165 is provided output enable 115 without any inversion, and thus it receives a low signal and turns off.

Transistors M2 155 and M3 160 receive the inverse of data 120 from the output of inverter 135. Since data 120 is low, the output of inverter 135 is high, and therefore, transistor M2 155 turns off and transistor M3 160 turns on. However, as previously discussed, transistor M4 165 is also turned off, and therefore, output node 170 is not being pulled high or low. That is, transistors M1 150 and M2 155 are turned off, and therefore, high supply voltage VCC is not provided to output node 170. Likewise, transistor M4 165 is turned off, and therefore, low supply voltage GND is not provided to output node 170. Accordingly, output node 170 is floating, or in a high impedance state as indicated by "Z" in truth table 200.

In the second row of truth table 200, data 120 is high and output enable 115 is low. Since output enable 120 is low, the output at output node 175 is floating, as indicated by the high impedance "Z" in truth table 200. For example, in the circuit of FIG. 1B, since data 120 is high, the output of inverter 135 is low. Transistor M2 155 turns on and transistor M3 160 turns off. However, as previously discussed, when output enable is low, transistors M1 150 and M4 165 turn off, and therefore, neither high supply voltage VCC nor low supply voltage GND are provided to output node 170. Accordingly, output node 170 is floating.

In the third row of truth table 200, data 120 is low and output enable is high. Therefore, output node 170 should follow data 120. For example, in the circuit of FIG. 1B, since output enable is high, transistor M4 165 turns on. Transistor M1 150 also turns on because the input to inverter 140 is output enable, which is high, and therefore its output is low. Since data 120 is low, the output of inverter 135 is high. Accordingly, transistor M2 155 turns off and transistor M3 160 turns on. Since both transistors M3 160 and M4 165 are turned on, and M4 165 is coupled to low supply voltage GND, output node 170 is pulled low rather than floating.

In the fourth row of truth table 200, both data 120 and output enable 115 are high. The output at output node 170 is high since output enable 115 is high, and therefore, the output follows data 120. For example, in the circuit of FIG. 1B, since output enable 115 is high, transistor M4 165 turns on. Additionally, transistor M1 150 also turns on since the output of inverter 140 is the inverse of output enable 115 (i.e., low). Since data 120 is high, the output of inverter 135 is low. Thus, transistor M3 160 turns off and transistor M2 155 turns on. Therefore, since transistors M1 150 and M2 155 are both on, output node 170 is driven high.

However, tri-stating the outputs when output enable 115 is low may not be appropriate for every interface standard. For example, some SDRAM (synchronous dynamic random-access memory) memories may require following a DDR4 (fourth generation double data rate) protocol which uses a Pseudo Open Drain (POD) I/O standard. POD I/O does not tri-state the output when the I/O is not supposed to be enabled. Rather, the output may be driven, such as pulled high instead of floating.

In some implementations, floating outputs may be undesirable because tri-stated signals may be more susceptible to signal integrity issues. For example, a tri-stated output may pick up noise which may make the output appear to be toggling. In some applications, such as DDR4, an output toggling in a particular manner may indicate data is being provided at the output. However, if the output is actually tri-stated, there should be no data to be read at the output (i.e., the output is supposed to be disabled). Therefore, the circuit of FIGS. 1A and 1B may not properly function with SDRAM DDR4 devices.

FIG. 2B illustrates a truth table for an I/O buffer compatible with the POD I/O standard. In FIG. 2B, truth table 250 differs from truth table 200 of FIG. 2A in that if output enable is low, the output is high rather than tri-stated. For example, outputs 255 are high in FIG. 2B rather than low as in outputs 205 in FIG. 2A when output enable is low. Accordingly, a circuit following truth table 250 in FIG. 2B may support the POD I/O standard used in SDRAM DDR4 devices.

Figure 3A:
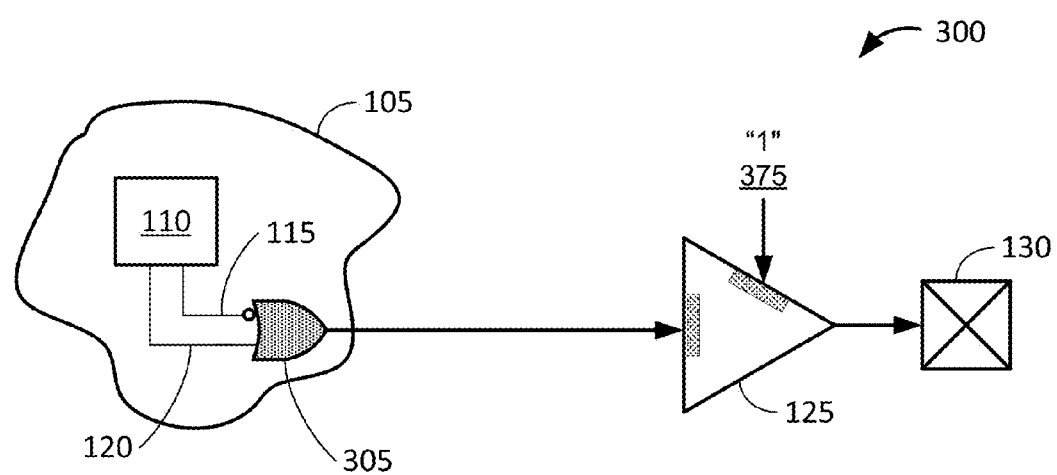
FIG. 3A illustrates an example of a PLD configured to support the POD I/O standard.

FIG. 3A illustrates an example of a PLD configured to support the POD I/O standard. In an implementation, an I/O may include I/O buffer 125 and output pad 130. Output enable 115 and data 120 may be routed in soft logic 105 from user design 110 to OR gate 305. OR gate 305 may include an inverted input for the output enable signal. For example, in an implementation, an inverter may be placed such that the input of the inverter is output enable 115 and the output of the inverter is coupled to an input of OR gate 305. The output of OR gate 305 may be provided to the data input of I/O buffer 125. Additionally, the native output enable input for I/O buffer 125 may be set or terminated to a fixed voltage, as indicated by "1" 375, rather than receiving output enable 115.

Figure 3B:
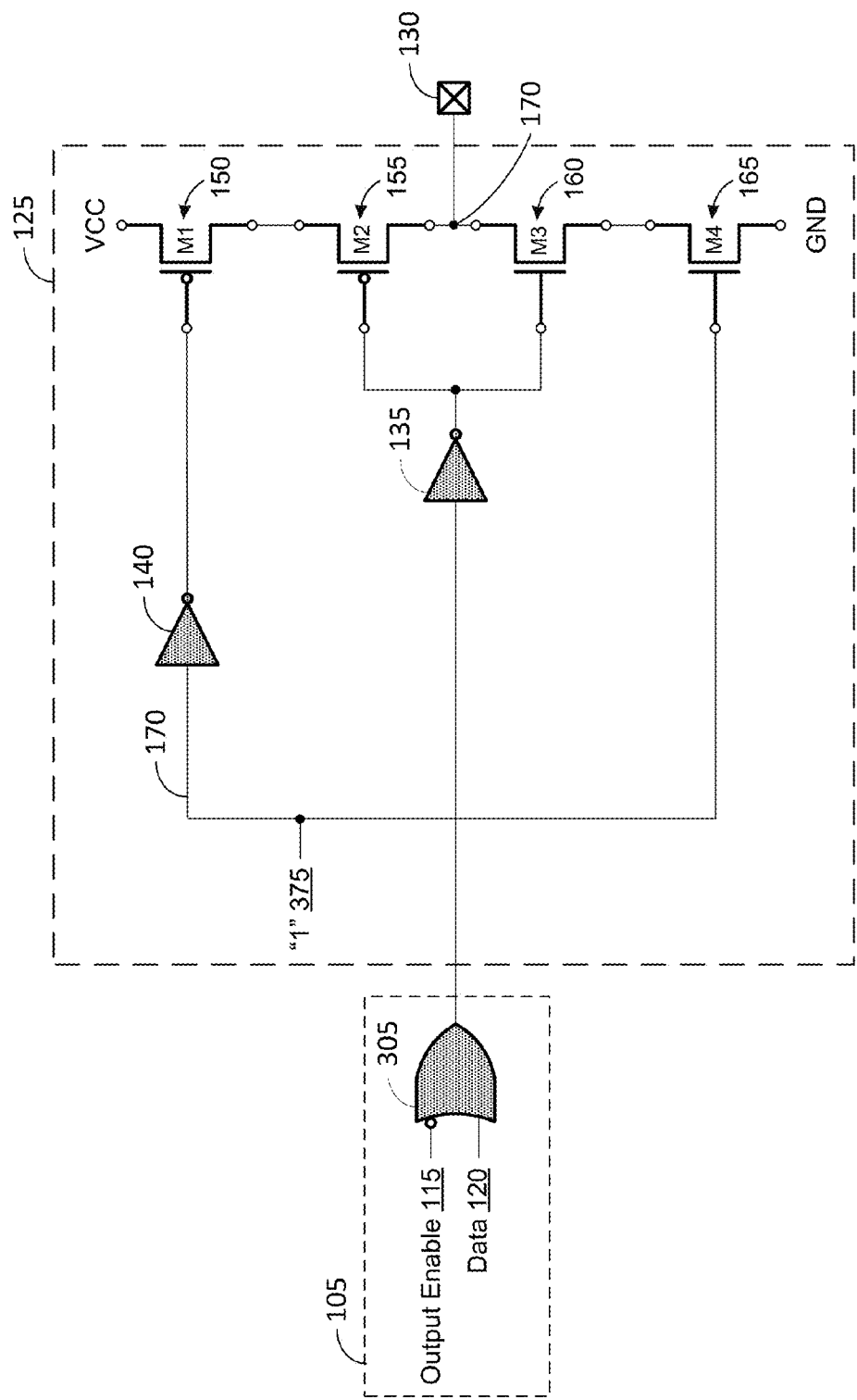
FIG. 3B illustrates a circuit schematic of an I/O buffer configured to support the POD I/O standard in accordance with some implementations.

FIG. 3B illustrates a circuit schematic of an I/O buffer configured to support the POD I/O standard in accordance with some implementations. In FIG. 3B, I/O buffer 125 includes the same transistors and inverters as the I/O buffer of FIG. 1B. That is, I/O buffer 125 in FIG. 3B also includes four transistors (transistors M1 150, M2 155, M3 160, and M4 165) and two inverters (inverters 135 and 140). However, because the native output enable interconnect 170 for I/O buffer 125 is terminated high (as indicated by "1" 375), and data 120 and an inverted output enable 115 are inputs to OR gate 305 whose output is provided to inverter 135, I/O buffer 125 may be configured to support the POD I/O standard by driving the output to high when the output is disabled.

For example, using the first row of truth table 250 of FIG. 2B, if data 120 is low and output enable 120 is low, output node 170 should be high rather than floating as in truth table 200. In the circuit of FIG. 3B, since "1" 375 drives interconnect 170 high, the output of inverter 140 is low, and therefore, transistor M1 150 turns on. Additionally, transistor M4 165 also turns on because interconnect 170 is driven high. That is, because "1" 375 is terminated high, both transistors M1 150 and M4 165 turn on. Output enable 115 is inverted (i.e., now high) and then provided to an input of OR gate 305. Data 120 is low and also provided as an input to OR gate 305. Accordingly, the output of OR gate 305 is high. The output of OR gate 305 is provided as an input to inverter 135, which provides a low output since the input is high. Accordingly, since the output of inverter 135 is low, transistor M2 155 turns on and transistor M3 160 turns off. Therefore, since transistor M1 150 and M2 155 are on, output node 170 is pulled high to VCC and provided to output pad 130.

In the second row of truth table 250, data 120 is high and output enable 115 is low. The output of OR gate 305 is high, and therefore, the output of inverter 135 is low. Accordingly, transistor M2 155 turns on and transistor M3 160 turns off. As previously discussed, transistors M1 150 and M4 165 are always on because "1" 375 is terminated high. Therefore, since both transistors M1 150 and M2 155 are on, output node 170 may also be pulled high to VCC and provided to output pad 130.

In the third row of truth table 250, data 120 is low and output enable 115 is high. Since output enable 115 is inverted before being provided as an input to OR gate 305, the inputs to OR gate 305 are both low, and therefore, the output of OR gate 305 is low. As such, the output of inverter 135 is high, and therefore, transistor M3 160 turns on and transistor M2 155 turns off. Since transistor M4 165 is always turned on and transistor M3 160 is turned on, output node 160 is pulled low to GND.

In the fourth row of truth table 250, both data 120 and output enable 115 are high. The output of OR gate 305 is high, and therefore, the output of inverter 135 is low. Transistor M2 155 turns on and transistor M3 160 turns off. Since transistor M1 150 is always turned on and transistor M2 155 is also turned on, output node 170 is pulled high to VCC.

Figure 4:
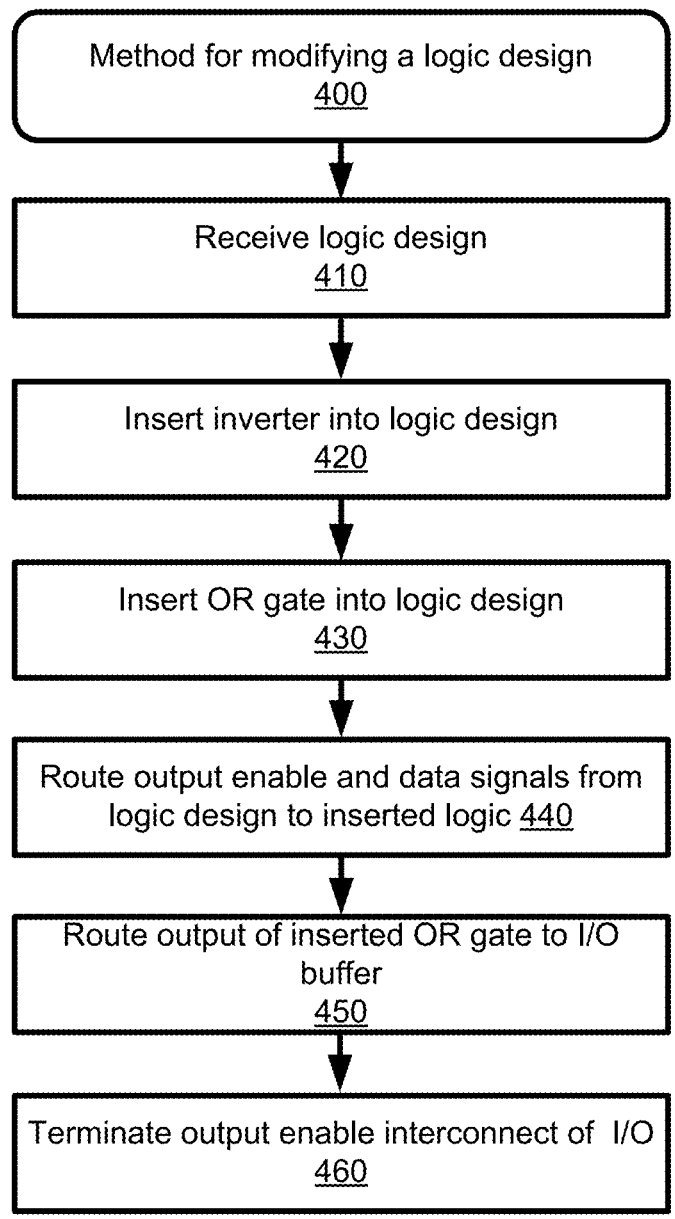
FIG. 4 is a flowchart illustrating a method for modifying a logic design to support the POD I/O standard for DDR4 SDRAM.

FIG. 4 is a flowchart illustrating a method for modifying a logic design to support the POD I/O standard for DDR4 SDRAM. In FIG. 4, at block 410, a logic design may be received. For example, the design may be implemented in a hardware description language (HDL) such as Verilog or VHDL. In another implementation, the design may be synthesized logic or a netlist. In block 420, an inverter may be inserted into the logic design. For example, an inverter to invert output enable 115 may be inserted, or instantiated, into the logic design. In block 430, an OR gate may be inserted into the logic design. Additionally, the output of the inverter may be routed to an input of the OR gate. In some implementations, a single logical function incorporating both an inverter and an OR gate may be inserted. In block 440, output enable 115 and data 120 may be routed from a user's design to the inserted logic (e.g., inverter or OR gate). At block 450, the output of the OR gate may be routed to an input of an I/O buffer. In an implementation, the output of the OR gate may be routed to a native data input of the I/O buffer. At block 460, a native output enable of the I/O may be routed to a power supply or terminated (e.g., high).

Though the circuits and techniques disclosed herein utilize NMOS and PMOS transistors, any other type of element with the functionality of a switch may be used. For example, bipolar junction transistors, memristors, and other components may be used. Depletion-type and/or enhancement-type NMOS and PMOS transistors may also be used.

Figure 5:
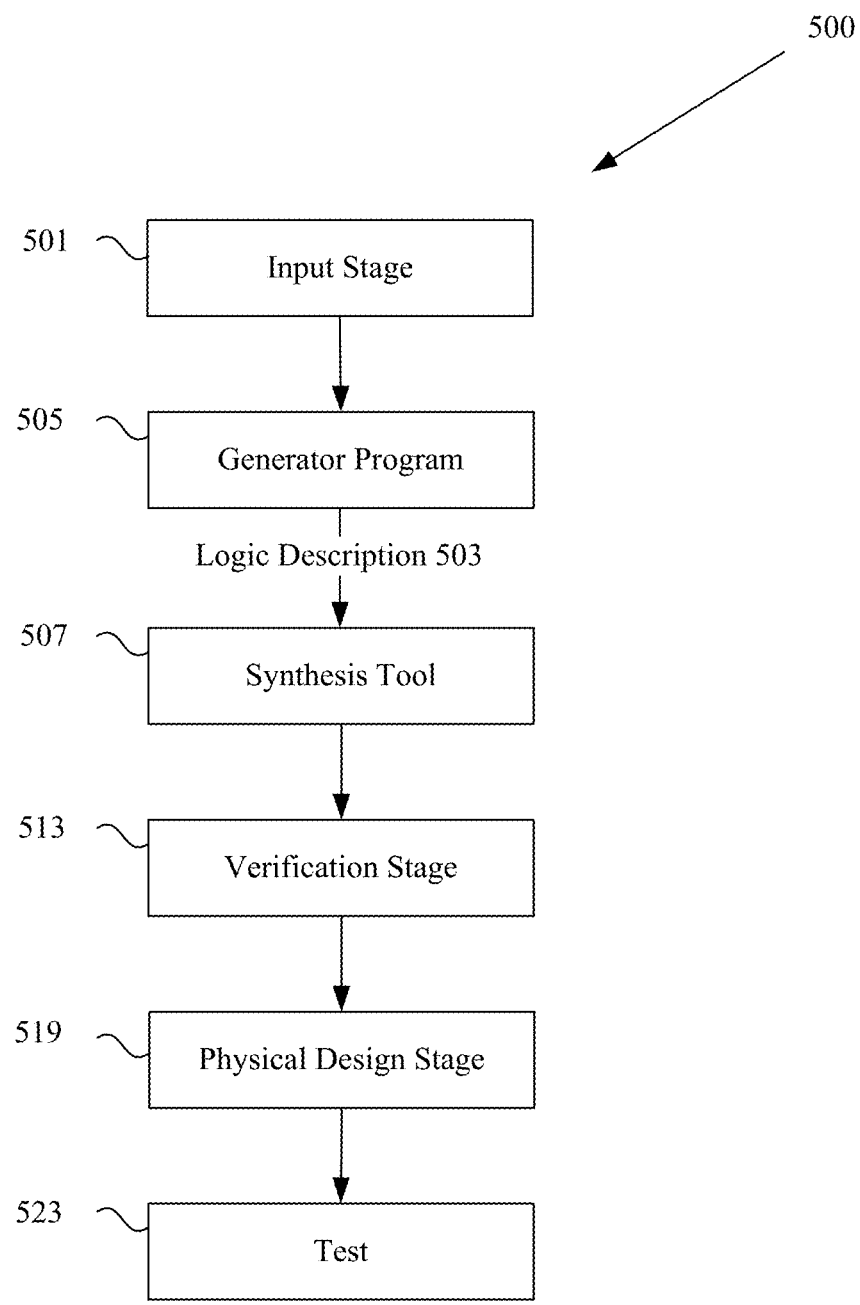
FIG. 5 illustrates a technique for implementing a programmable chip.

FIG. 5 illustrates a technique for implementing a programmable chip. An input stage 501 receives selection information typically from a user for logic such as a processor core as well as other components to be implemented on an electronic device. In one example, the input received is in the form of a high-level language program. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. The input stage 501 also allows configuration of hard coded logic. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various modules selected. At this stage, the user may enter security information about individual components that needs to be isolated. For example, different levels of component security and which components are allowed to communicate with each other may be entered.

In typical implementations, the generator program 505 can identify the selections and generate a logic description with information for implementing the various modules. The generator program 505 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 505 identifies pointers and provides ports for each pointer. One tool with generator program capabilities is System on a Programmable Chip (SOPC) Builder available from Altera Corporation of San Jose, Calif. The generator program 505 also provides information to a synthesis tool 507 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 523.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 6:
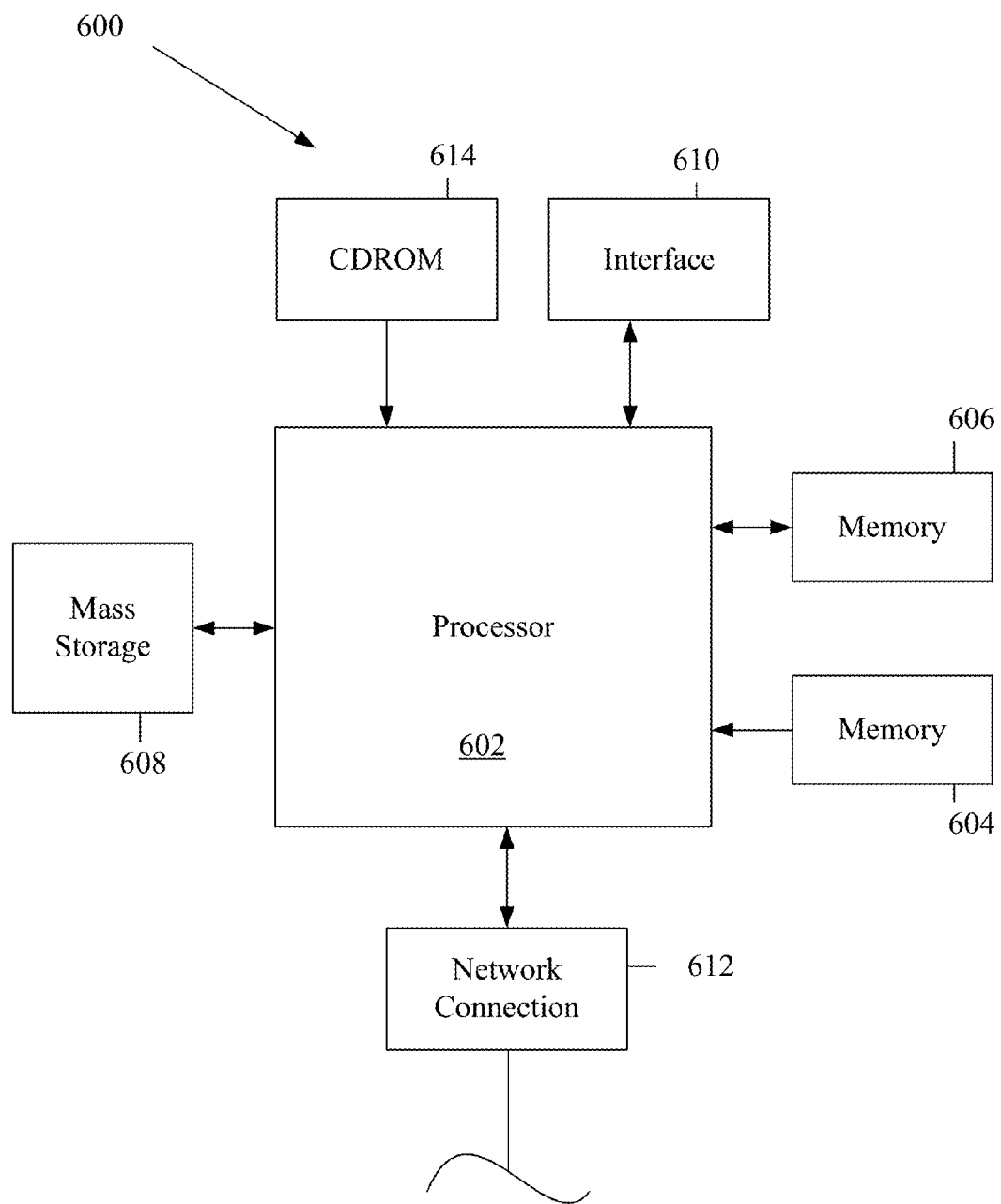
FIG. 6 illustrates one example of a computer system.

FIG. 6 illustrates one example of a computer system. The computer system 600 includes any number of processors 602 (also referred to as central processing units, or CPUs) that are coupled to devices including memory 606 (typically a random access memory, or "RAM"), memory 604 (typically a read only memory, or "ROM"). The processors 602 can be configured to generate an electronic design. As is well known in the art, memory 604 acts to transfer data and instructions uni-directionally to the CPU and memory 606 are used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 602 may be a design tool processor. Finally, CPU 602 optionally may be coupled to a computer or telecommunications network using a network connection as shown generally at 612. With such a network connection, it is contemplated that the CPU might receive information from the network, or might output information to the network in the course of performing the above-described process steps. It should be noted that the system 600 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A programmable logic device, comprising:
   configurable input/output (I/O) circuitry comprising:
   a pad configured to couple the programmable logic device to an external electronic device; and
   a tri-state output buffer comprising a tri-state input, a data input, and an output, wherein the output of the tri-state output buffer is electrically coupled to the pad, wherein the tri-state output buffer is configured to provide a high-impedance output when the tri-state input receives a disable logic value, and to provide a signal received in the data input when the tri-state input receives an enable logic value; and
   output configuration circuitry configured to receive an output signal from a user design circuitry of the programmable logic device, and configured to operate in at least two modes, wherein the at least two modes comprise:
   a tri-state mode, wherein the output configuration circuitry is configured to provide an enable signal to the tri-state input of the tri-state output buffer and to provide the received output signal to the data input of the tri-state output buffer; and
   a pseudo open drain (POD) mode, wherein the output configuration circuitry is configured to hold the enable logic value in the tri-state input of the tri-state output buffer, to create a hybrid output signal based on the received output signal and the enable signal, and to provide the hybrid output signal to the data input of the tri-state output buffer, wherein the hybrid output signal comprises:
   the received output signal when the enable signal comprises the enable logic value; and
   a fixed logic value when the enable signal comprises the disable logic value.

2. The programmable logic device of claim 1, wherein, in the pseudo open drain (POD) mode, the output configuration circuitry is configured to receive the enable signal from the user design circuitry.

3. The programmable logic device of claim 1, wherein the output configuration circuitry generates the enable signal.

4. The programmable logic device of claim 1, wherein, in the pseudo open drain (POD) mode, creating the hybrid output signal comprises gating the received output signal based on the enable signal.

5. The programmable logic device of claim 1, wherein, in the pseudo open drain (POD) mode, creating a hybrid output signal comprises placing an OR gate configured to receive the received output signal and the enable signal.

6. The programmable logic device of claim 1, wherein the programmable logic device operating in the pseudo open drain (POD) conforms to a fourth generation double data rate (DDR4) standard.

7. The programmable logic device of claim 1, wherein the external electronic device comprises a fourth generation double data rate (DDR4) memory device.

8. A non-transitory computer-readable medium comprising instructions that, when executed, causes a processor to:
   receive a first configuration of a set of configurations for tri-state input/output (TO) circuitry of a programmable logic device, wherein the tri-state IO circuitry comprises a tri-state buffer configured to provide a floating high-impedance value to the output of the tri-state IO circuitry when a tri-state enable input coupled to the tri-state buffer receives a disable logic value that indicates that there is no data signal output, and wherein the first configuration comprises a pseudo open drain (POD) standard that comprises providing a fixed output of the tri-state IO circuitry when there is no data signal output;
   create programming instructions to configure the tri-state IO circuitry of the programmable logic device based on the first configuration, wherein the programming instructions are configured to cause the programmable logic device to provide an enable signal to the tri-state enable input port of the tri-state IO circuitry and a hybrid output signal to a data input port of the tri-state IO circuitry, and wherein the hybrid output signal comprises:
   the received output signal when the programmable logic device indicates that there is a data output signal; and
   a fixed logic value when the programmable logic device indicates that the there is no data output signal; and
   sending the programming instructions to the programmable logic device.

9. The non-transitory computer-readable medium of claim 8, wherein the fixed logic value conforms to the pseudo open drain (POD) standard.

10. The non-transitory computer-readable medium of claim 8, wherein the interface standard comprises a memory device standard.

11. The non-transitory computer-readable medium of claim 10, wherein the memory device standard comprises a fourth generation double data rate (DDR4) standard.

12. The non-transitory computer-readable medium of claim 8, wherein the programming instructions cause the programmable logic device to provide the hybrid output signal to the data input port of the tri-state IO circuitry by configuring a gate that receives the output signal from the logic circuitry and the enable signal from the logic circuitry and provides the hybrid output signal.

13. The non-transitory computer-readable medium of claim 12, wherein the gate comprises an OR gate.

14. The non-transitory computer readable medium of claim 8, wherein the instructions, when executed, causes the processor to:
receive a second configuration of the set of configurations for the tri-state TO circuitry of the programmable logic device, wherein the second configuration comprises an interface standard that comprises tri-stating the output of the tri-state TO circuitry when the output is disabled; and
create programming instructions to configure the tri-state TO circuitry of the programmable logic device based on the second configuration, wherein the programming instructions are configure to cause the programmable logic device to provide the enable signal to the tri-state input port of the tri-state TO circuitry when the output is enabled and to provide a disable signal to the tri-state input port of the tri-state TO circuitry when the output is disabled.

15. A system comprising:
a memory device; and
processing circuitry coupled to the memory device via a pseudo open drain (POD) compliant interface, the processing circuitry comprising:
a pad coupled to the interface;
tri-state input/output (TO) circuitry comprising a tri-state output buffer, a tri-state input, a data input, and an output electrically coupled to the pad, wherein the tri-state output buffer is configured to provide a high-impedance output when the tri-state input receives a disable logic value, and to provide a signal received in the data input when the tri-state input receives an enable logic value; and
input/output (TO) processing circuitry comprising an output configuration circuitry coupled to the tri-state TO circuitry configured to transmit an output signal from the processing circuitry to the memory device, and configured to operate in at least two modes, wherein the at least two modes comprise:
an open-drain mode, wherein the output configuration circuitry is configured to provide an enable logic value to the tri-state input and a received output signal to the data input when an output of the processing circuitry is enabled, and to provide a disable logic value to the tri-state input when the output of the processing circuitry is disabled; and
a pseudo-open drain (POD) mode, wherein the output configuration circuitry is configured to hold the enable logic value in the tri-state input of the tri-state output buffer, to create a hybrid output signal based on the received output signal and an enable signal, and to provide the hybrid output signal to the data input of the tri-state output buffer, wherein the hybrid output signal comprises the received output signal when the enable signal comprises the enable logic value and the hybrid output signal comprises a fixed logic value when the enable signal comprises the disable logic value.

16. The system of claim 15, wherein the memory device comprises a double data rate (DDR4) memory device.

17. The system of claim 15, wherein the interface comprises a bi-directional interface.

18. The system of claim 15, wherein the processing circuitry comprises a programmable logic device.

19. The system of claim 15, wherein, in the pseudo-open drain mode, creating the hybrid output signal comprises gating the received output signal based on the enable signal.

20. The system of claim 19, wherein the TO processing circuitry comprises an OR gate that gates the received output signal based on the enable signal.

* * * * *